(12) United States Patent
Hussell et al.

(10) Patent No.: US 8,748,905 B2
(45) Date of Patent: *Jun. 10, 2014

(54) HIGH EFFICACY SEMICONDUCTOR LIGHT EMITTING DEVICES EMPLOYING REMOTE PHOSPHOR CONFIGURATIONS

(75) Inventors: Christopher P. Hussell, Cary, NC (US); Florin Tudorica, Durham, NC (US); David Todd Emerson, Chapel Hill, NC (US)

(73) Assignee: Cree, Inc., Durham, NC (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/278,238

(22) Filed: Oct. 21, 2011

(65) Prior Publication Data

US 2012/0126260 A1 May 24, 2012

Related U.S. Application Data

(63) Continuation-in-part of application No. 13/087,510, filed on Apr. 15, 2011, which is a continuation-in-part of application No. 12/273,216, filed on Nov. 18, 2008, now Pat. No. 8,004,172.

(51) Int. Cl.
*H01L 27/15* (2006.01)

(52) U.S. Cl.
USPC ............................................. 257/80; 257/88

(58) Field of Classification Search
USPC ................................................... 257/80, 88
See application file for complete search history.

(56) References Cited

U.S. PATENT DOCUMENTS

| | | |
|---|---|---|
| D566,057 S | 4/2008 | Edmond et al. |
| D582,866 S | 12/2008 | Edmond et al. |
| 7,843,060 B2 * | 11/2010 | Edmond ............... 257/724 |
| 2008/0173884 A1 | 7/2008 | Chitnis et al. |
| 2008/0179611 A1 | 7/2008 | Chitnis et al. |
| 2011/0227469 A1 | 9/2011 | Yuan et al. |
| 2012/0193660 A1 | 8/2012 | Donofrio et al. |

OTHER PUBLICATIONS

U.S. Appl. No. 13/087,510, filed Apr. 15, 2011.*
Cree, Inc., Data Sheet CPR3CR, Rev. A, *Cree® EZ1000™ LEDs Data Sheet CxxxEZ1000-Sxx000*, 2006, 6 pp.
U.S. Appl. No. 13/152,863, filed Jun. 3, 2011 entitled *Red Nitride Phosphors*.
U.S. Appl. No. 13/153,155, filed Jun. 3, 2011 entitled *Methods of Determining and Making Red Nitride Compositions*.
U.S. Appl. No. 13/154,872, filed Jun. 7, 2011 entitled *Gallium-Substituted Yttrium Aluminum Garnet Phosphor and Light Emitting Devices Including the Same*.

* cited by examiner

*Primary Examiner* — Douglas Menz
(74) *Attorney, Agent, or Firm* — Myers Bigel Sibley & Sajovec, P.A.

(57) ABSTRACT

A semiconductor light emitting apparatus a semiconductor light emitting device configured to emit light inside a hollow shell including wavelength conversion material dispersed therein or thereon. A semiconductor light emitting apparatus according to some embodiments is capable of generating in excess of 230 lumens per watt.

18 Claims, 11 Drawing Sheets

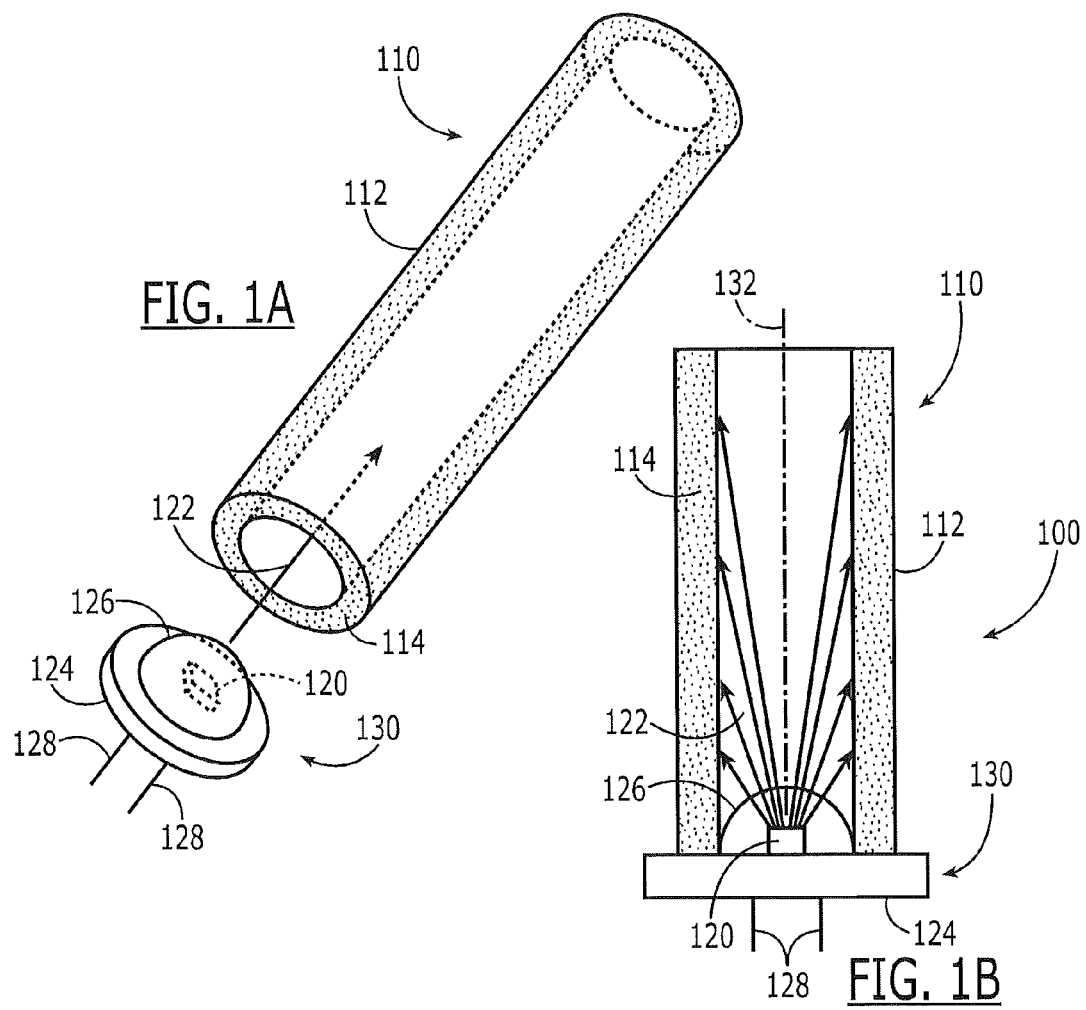
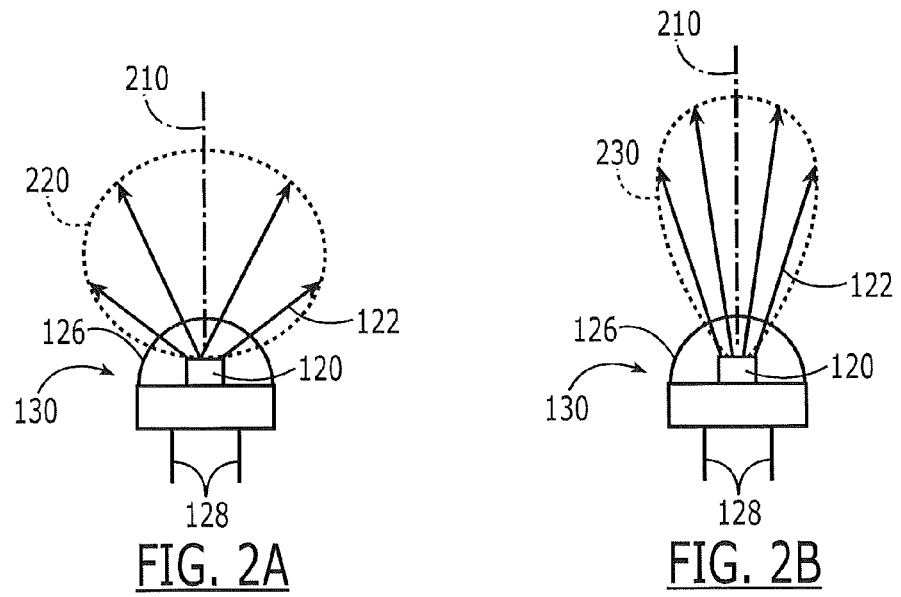

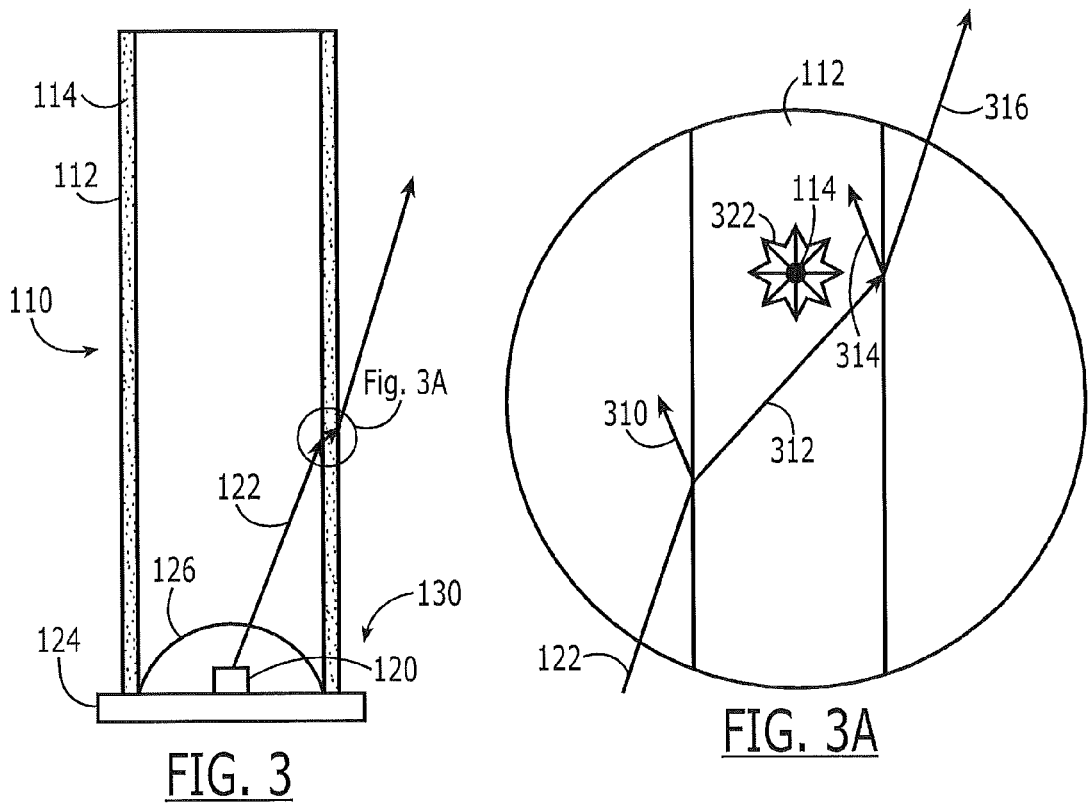
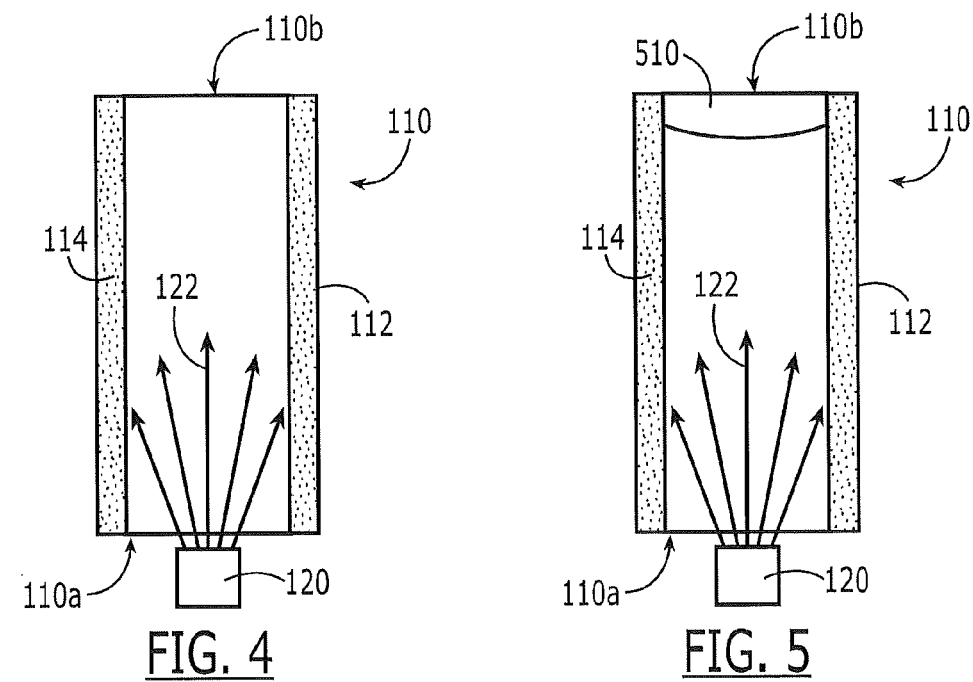

HIGH EFFICACY SEMICONDUCTOR LIGHT EMITTING DEVICES EMPLOYING REMOTE PHOSPHOR CONFIGURATIONS

RELATED APPLICATIONS

The present application is a continuation-in-part of U.S. patent application Ser. No. 13/087,510, filed on Apr. 15, 2011, which itself is a continuation-in-part of U.S. patent application Ser. No. 12/273,216, filed on Nov. 18, 2008 now U.S. Pat. No. 8,004,172, the disclosures of which are hereby incorporated by reference herein as if set forth in its entirety.

BACKGROUND

This invention relates to light emitting apparatus and methods of assembling and operating same, and more particularly to semiconductor light emitting apparatus and methods of assembling and operating same.

Semiconductor light emitting devices ("LEDs"), such as light emitting diodes and laser diodes, are widely known solid-state lighting elements that are capable of generating light upon application of voltage thereto. Light emitting devices generally include a p-n junction, an anode ohmic contact for the p-type region of the device, and a cathode ohmic contact for the n-type region of the device. The device may be formed on a substrate, such as a sapphire, silicon, silicon carbide, gallium arsenide, gallium nitride, etc., substrate, or the device may not include a substrate. The semiconductor p-n junction may be fabricated, for example, from silicon carbide, gallium nitride, gallium phosphide, aluminum nitride and/or gallium arsenide-based materials and/or from organic semiconductor-based materials.

Semiconductor LEDs may be used in lighting/illumination applications, for example, as a replacement for conventional incandescent and/or fluorescent lighting. As such, it is often desirable to provide a lighting source that generates white light having a relatively high color rendering index (CRI), so that objects illuminated by the lighting may appear as they do with incandescent light sources. The color rendering index of a light source is an objective measure of the ability of the light generated by the source to accurately illuminate a broad range of colors. The color rendering index ranges from essentially zero for poor white-light sources to nearly 100 for incandescent sources. A CRI greater than 80 is often desirable. A CRI greater than 90 is generally considered high quality and almost indistinguishable from an incandescent source.

In addition, the chromaticity of a particular light source may be referred to as the "color point" of the source. For a white light source, the chromaticity may be referred to as the "white point" of the source. The white point of a white light source may fall along a locus of chromaticity points corresponding to the color of light emitted by a black-body radiator heated to a given temperature. Accordingly, a white point may be identified by a correlated color temperature (CCT) of the light source, which is the temperature of the heated black-body radiator with emission that matches the color or hue of the white light source. White light typically has a CCT of between about 2000 and 8000K. White light with a CCT of 4000 is considered neutral white which generally doesn't have an apparent hue. White light with a CCT of 8000K is more bluish in color, and may be referred to as "cool white". "Warm white" may be used to describe white light with a CCT of between about 2600K and 3500K, which is more reddish in color.

In order to produce white light, multiple LEDs emitting light of different colors of light may be used. The light emitted by the LEDs may be combined to produce a desired intensity and/or color of white light. For example, when red-, green- and blue-emitting LEDs are energized simultaneously, the resulting combined light may appear white, or nearly white, depending on the relative intensities of the component red, green and blue sources. However, in LED lamps including red, green, and blue LEDs, the spectral power distributions of the component LEDs may be relatively narrow (e.g., about 10-30 nm full width at half maximum (FWHM)). While it may be possible to achieve fairly high luminous efficacy and/or color rendering with such lamps, wavelength ranges may exist in which it may be difficult to obtain high efficiency (e.g., approximately 550 nm).

Alternatively, the light from a single-color LED may be converted to white light by surrounding the LED with a wavelength conversion material, such as phosphor particles. The term "wavelength conversion material" is used herein to refer to any material that absorbs light at one wavelength and re-emits light at a different wavelength, regardless of the delay between absorption and re-emission and regardless of the wavelengths involved. Accordingly, the term "wavelength conversion material" may be used herein to refer to materials that are sometimes called fluorescent and/or phosphorescent and often referred to as "phosphors". In general, phosphors absorb light having shorter wavelengths and re-emit light having longer wavelengths. As such, some or all of the light emitted by the LED at a first wavelength may be absorbed by the phosphor particles, which may responsively emit light at a second wavelength. For example, a blue emitting LED may be surrounded by a yellow phosphor, such as cerium-doped yttrium aluminum garnet (YAG). The resulting light, which is a combination of blue light and yellow light, may appear white to an observer.

Accordingly, efforts have been made to integrate a semiconductor light emitting device with wavelength conversion material to provide a semiconductor light emitting apparatus. The wavelength conversion material may be coated on the LED itself, may be provided in a drop of material between the semiconductor LED and the dome of an LED (also referred to as a shell or lens) and/or may be provided remote from the semiconductor LED by providing wavelength conversion material inside, outside and/or within the dome of an LED and/or on/within another surface remote from the LED.

SUMMARY

A semiconductor light emitting apparatus according to some embodiments includes a wavelength conversion element comprising wavelength conversion material, and a light emitting diode that is oriented to emit light to impinge upon the wavelength conversion element. The semiconductor light emitting apparatus may produce greater than 230 lumens per watt at a color temperature of between 2000 K and 8000 K.

The light emitting diode may include a blue light emitting diode. In particular embodiments, the light emitting diode may have an area greater than about 1 $mm^2$, and in some embodiments the light emitting diode has an area of about 3 $mm^2$. For example, the diode may have dimensions of about 1.75 mm×1.75 mm or more. For example, in some embodiments, the light emitting diode may have an area of about 4 $mm^2$ with dimensions of about 2 mm×2 mm.

An apparatus according some embodiments may produce greater than 230 lumens per watt at a color temperature of between 4000 K and 5000 K. For example, an apparatus according to some embodiments may produce greater than 200 lumens per watt at a color temperature of about 4600 K.

An apparatus according some embodiments may produce greater than 230 lumens per watt at a drive current of 350 mA or less at room temperature.

An apparatus according to some embodiments includes a light emitting diode having a cross sectional area selected to provide a current density of less than 15 A/cm² at a drive current at which the semiconductor light emitting apparatus produces greater than 200 lumens per watt at a color temperature of between 2000 K and 8000 K. In some embodiments, the light emitting diode has an area selected to provide a current density of less than 10 A/cm² at a drive current at which the semiconductor light emitting apparatus produces greater than 200 lumens per watt at a color temperature of between 2000 K and 8000 K, and in some embodiments the light emitting diode has an area selected to provide a current density of less than 5 A/cm² at a drive current at which the semiconductor light emitting apparatus produces greater than 200 lumens per watt at a color temperature of between 2000 K and 8000 K.

The apparatus may further include a substrate, one or more light emitting diodes disposed on the substrate, a transparent outer shell covering the substrate and the light emitting devices and defining a volume between the light emitting diodes and the shell, and an optical material remotely located at least a first distance away from the one or more light emitting devices for affecting light emitted from the one or more light emitting devices.

A light emitting apparatus according to some embodiments includes a substrate, one or more light emitting diodes disposed on the substrate, a transparent outer shell covering the substrate and the light emitting devices and defining a volume of space between the light emitting diodes and the shell, and an optical material remotely located at least a first distance away from the one or more light emitting devices for affecting light emitted from the one or more light emitting devices. The semiconductor light emitting apparatus produces greater than 230 lumens per watt at a color temperature of between 2000 K and 8000 K.

The optical material may include a phosphor material. The phosphor material may be disposed on the shell. In some embodiments, the phosphor material may be coated on an inner or outer surface of the shell.

The apparatus may include light emitting devices adapted for a light emission having a color rendering index of about 80 or more. In some aspects, the apparatus may include light emitting devices adapted for a light emission having a color rendering index of about 90 or more.

BRIEF DESCRIPTION OF THE DRAWINGS

FIG. 1A a perspective view of a semiconductor light emitting apparatus according to various embodiments.

FIG. 1B is a cross-sectional view of a semiconductor light emitting apparatus according to other embodiments.

FIGS. 2A and 2B are cross-sectional views of packaged semiconductor light emitting devices.

FIGS. 3-10 are cross-sectional views of semiconductor light emitting apparatus according to various other embodiments.

DETAILED DESCRIPTION

Figure 6:
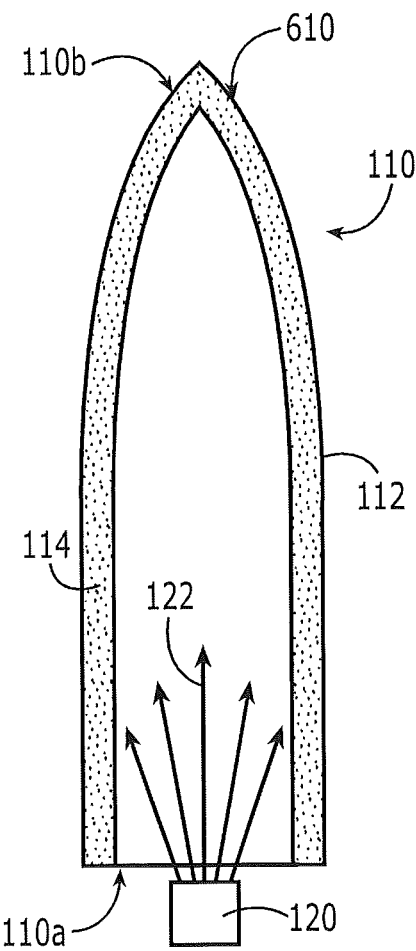

The present invention now will be described more fully with reference to the accompanying drawings, in which various embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

The terminology used herein is for the purpose of describing particular embodiments only and is not intended to be limiting of the present invention. As used herein, the singular foul's "a," "an" and "the" are intended to include the plural forms as well, unless the context clearly indicates otherwise, It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

It will be understood that when an element such as a layer, region or substrate is referred to as being "on" another element, it can be directly on the other element or intervening elements may also be present. Furthermore, relative terms such as "beneath" or "overlies" may be used herein to describe a relationship of one layer or region to another layer or region relative to a substrate or base layer as illustrated in the figures. It will be understood that these terms are intended to encompass different orientations of the device in addition to the orientation depicted in the figures. Finally, the term "directly" means that there are no intervening elements. As used herein, the term "and/or" includes any and all combinations of one or more of the associated listed items and may be abbreviated as "/".

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the invention are described herein with reference to cross-sectional and/or other illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as a rectangle will, typically, have rounded or curved features due to normal manufacturing tolerances. Thus, the regions illustrated in the figures are schematic in nature and their shapes are not intended to illustrate the precise shape of a region of a device and are not intended to limit the scope of the invention, unless otherwise defined herein.

Unless otherwise defined herein, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIGS. 1A and 1B are a perspective view and a cross-sectional view of semiconductor light emitting apparatus according to various embodiments of the present invention. As shown in FIGS. 1A and 1B, these semiconductor light emitting apparatus include an elongated hollow wavelength conversion tube 110 that comprises an elongated wavelength conversion tube wall 112 having wavelength conversion material 114 uniformly or non-uniformly dispersed therein. As used herein, a tube denotes a long hollow object that may be, but need not be, cylindrical. Accordingly, the tube may be circular, elliptical, ellipsoidal and/or polygonal. A semiconductor light emitting device 120 is oriented to emit light 122 inside the elongated hollow wavelength conversion tube 110 to impinge upon the elongated wavelength conversion tube wall 112 and the wavelength conversion material 114 dispersed therein. In some embodiments, the semiconductor light emitting device 120 may be a packaged light emitting diode 130 that includes a mounting substrate 124 and a dome 126 on the mounting substrate 124, wherein the semiconductor light emitting device 120 is located between the mounting substrate 124 and the dome 126. One or more electrical leads 128 may extend from the mounting substrate 124. As also shown in FIGS. 1A and 1B, the tube wall 112 defines a tube axis 132, and the semiconductor light emitting device 120 is configured to emit light 122 generally symmetrically about an emission axis and is oriented such that the emission axis is generally coincident with the tube axis 132.

Various configurations of the semiconductor light emitting device 120, the mounting substrate 124 and the dome 126 may be provided according to various embodiments of the present invention. In some embodiments, the packaged semiconductor light emitting device 130 may be represented by a commercially available LED, such as a Cree® EZ1000™ LED, manufactured by the assignee of the present invention, and described in the Data Sheet CPR3CR, Rev. A, entitled Cree® EZ1000™ LEDs Data Sheet CxxxEZ1000-Sxx000, copyright 2006, Cree, Inc., available on the Web at cree.com. As indicated in this data sheet, these LEDs may use a single semiconductor die of size 980/980 µm$^2$ or about 1 mm$^2$. These LEDs may operate at a voltage of about 3 V (more typically about 3.3 V), and a current of about 350 mA (current density of about 35 A/cm$^2$) for an input power of about 1 watt. The Cree® EZ1000 LED may be manufactured under one or more of the following U.S. patents/applications, the disclosures of which are hereby incorporated herein in their entirety as if set forth fully herein: U.S. Pat. No. D566,057, issued Apr. 8, 2008, entitled LED Chip; U.S. Application Publication No. 2008/0173884, published Jul. 24, 2008, entitled Wafer Level Phosphor Coating Method and Devices Fabricated Utilizing Same; U.S. Application Publication No. 2008/0179611, published Jul. 31, 2008, entitled Wafer Level Phosphor Coating Method and Devices Fabricated Utilizing Same; and U.S. application Ser. No. 29/284,431, filed Sep. 7, 2007, entitled LED Chip. However, other commercially available packaged LEDs or bare LED dice may be used.

In some embodiments, the light emitting device 130 may be an LED chip as illustrated in U.S. application Ser. No. 13/018,013, filed January 31, 201, entitled Horizontal Light Emitting Diodes Including Phosphor Particles, the disclosure of which is hereby incorporated herein in its entirety as if set forth fully herein.

The LED may be provided on a silver (Ag) header and encapsulated with a dome comprising, for example, Hysol® OS4000 fast curing water-white epoxy casting compound, marketed by Loctite. However, in other embodiments, other materials, such as epoxy, silicone and/or other transparent encapsulants may also be used. Moreover, the LED need not have a dome, so that a bare die or a domeless LED also may be used. In some embodiments, as shown in FIG. 1A, the semiconductor light emitting device 120 may be adjacent but not within the elongated hollow wavelength conversion tube 110. In other embodiments, as shown in FIG. 1B, the semiconductor light emitting device 120 may be at least partially within the elongated hollow wavelength conversion tube 110. In still other embodiments, the transparent dome 126 may be entirely within the elongated hollow wavelength conversion tube 110, whereas the mounting substrate 124 may be entirely outside and up against an end of the elongated hollow wavelength conversion tube.

In fact, FIGS. 1A and 1B also illustrate methods of assembling a semiconductor light emitting apparatus according to some embodiments, wherein a dome 126 that surrounds a semiconductor light emitting device 120 that is on a substrate 124 is inserted at least partially into an end of an elongated hollow wavelength conversion tube 110 having wavelength conversion material 114 dispersed therein. The dome may be press-fit inside the tube or an adhesive or other attaching element may be used.

The elongated hollow wavelength conversion tube 110 may be constructed from a sheet of plastic, epoxy, silicone, glass, quartz, and/or other transparent or translucent material, such as the aforementioned OS4000 material, that contains phosphor dispersed therein. The material may be mixed with phosphor at a desired concentration and then formed into a sheet, which is allowed to cure. The sheet may be rolled and glued into a tube and cut to a desired length. Alternatively, straws of plastic material including phosphor encapsulated therein may be provided and cut to size. Moreover, the hollow wavelength conversion tube 110 may be molded, extruded and/or formed by other conventional processes. The phosphor may be conventional YAG phosphor, conventional (Ca, Si, Ba) SiO$_4$:Eu$^{2+}$ (BOSE) phosphor and/or other conventional phosphors that may vary in composition and/or concentration depending upon the characteristics of the semiconductor light emitting device 120 and/or other parameters. The elongated hollow wavelength conversion tube 110 may be evacuated, air-filled or filled with an inert and/or reactive gas. The tube may also include a solid and/or gel therein to provide, for example, encapsulant, index matching, etc. The wavelength conversion material 114 may be uniformly or non-uniformly dispersed in the elongated wavelength conversion tube wall 112. Uniform or non-uniform composition and/or concentration may be employed.

Figure 19:
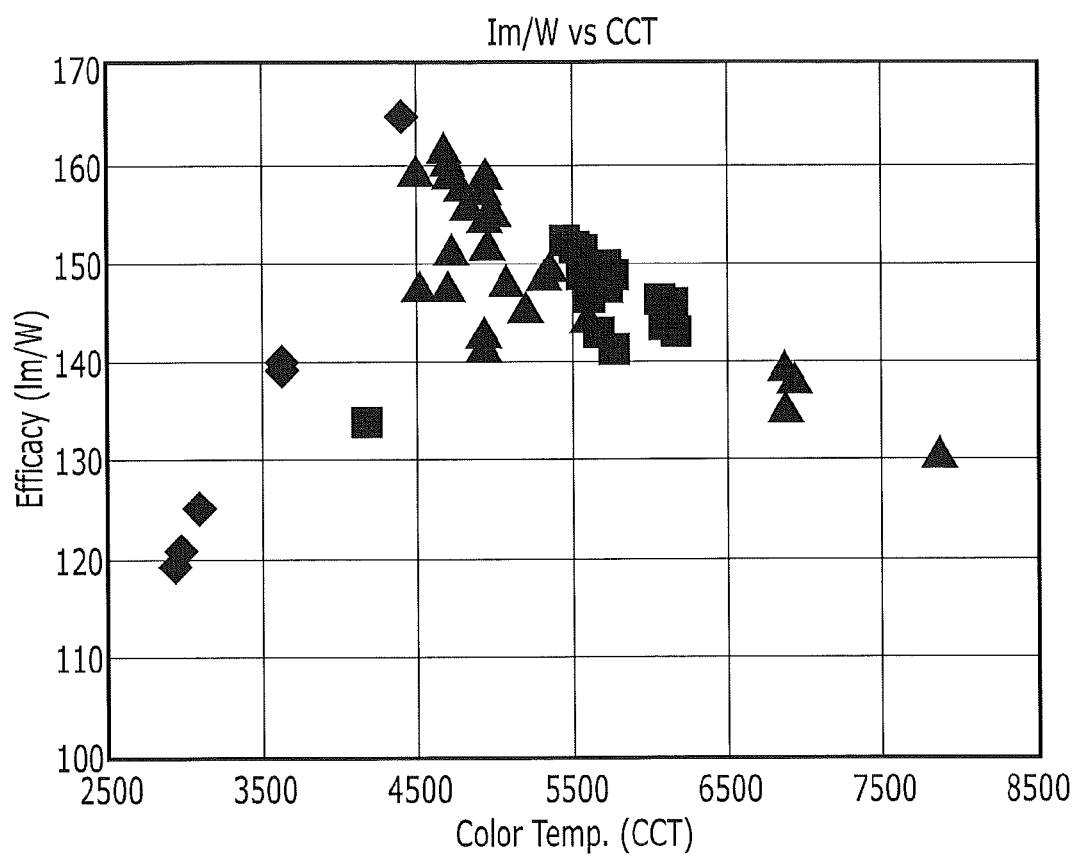
FIG. 19 graphically illustrates efficiency in lumens per watt as a function of CCT for semiconductor light emitting apparatus according to various embodiments.

Dimensionally, the elongated hollow wavelength conversion tube 110 may have a length of between about 1 mm and about 100 mm, and an inner diameter of between about 0.5 mm and about 10 mm. The inner diameter can be larger, e.g., 20-30 mm in some embodiments. The tube wall 112 may have a thickness of between about 0.05 mm and about 2 mm. Wavelength conversion particles may be dispersed therein at concentrations between about 1% and about 70% by weight. The use of an elongated hollow wavelength conversion tube according to various embodiments of the invention may provide efficient white light. For example, a Cree EZ1000 LED having about a 1 $mm^2$ size and a drive current of about 350 mA at room temperature in combination with an elongated hollow wavelength conversion tube that is about 45 mm long, having an inside diameter of about 9 mm and a wall thickness of about 2 mm, and being fabricated from a sheet of flexible transparent silicone having BOSE phosphor dispersed therein at a concentration of about 30% by weight, can produce about 170 lumens of light output, about 160 lumens/watt efficiency at a correlated color temperature of about 4700K, and about 150 lumens/watt efficiency at a correlated color temperature of about 5500K. FIG. 19 graphically illustrates efficiency in lumens/watt (lm/w) vs. CCT, for these example embodiments. It will be understood that, in FIG. 19, various concentrations of phosphors may be used to obtain the desired color temperature.

Without wishing to be bound by any theory of operation, high efficiency white light production may be obtained according to various embodiments of the present invention by causing almost all of the light that is emitted by the semiconductor light emitting device 120 to strike the elongated wavelength conversion tube wall 112 at an oblique angle. More specifically, referring to FIG. 2A, a packaged light emitting diode may emit light in a Lambertian pattern 220, wherein the radiant intensity is directly proportional to the cosine of the angle between the observer's line of sight and an axis 210 that is normal to the surface of the semiconductor light emitting device 130. The Lambertian pattern 220 may be obtained by designing the light emitting device 120 to emit light in a Lambertian pattern, and designing the dome 126 so as not to change this emission pattern, or by designing the light emitting device 120 to emit light in a non-Lambertian pattern and by designing one or more optical elements in the dome 126, so that the light that emerges from the dome 126 is Lambertian. In other embodiments, as shown in FIG. 2B, a packaged or unpackaged light emitting diode may emit light in a focused (i.e., narrow far-field emission) pattern 230, wherein more radiant energy is emitted closer to the axis 210 of emission than to the sides. Again, this focused pattern may be obtained by designing the light emitting device 120 to emit light in a focused pattern and designing the dome 126 so as to not change this emission pattern or by designing the light emitting device 120 to emit light in a non-focused pattern and by designing one or more optical elements in the dome 126 so that the light emerges from the dome 126 in a focused pattern. Other conventional emission patterns may be used.

Conventionally, the dome 126 may be designed to be hemispherical so that the emitted light 122 crosses the dome perpendicular to the dome surface. Thus, if phosphor is coated on the inner and/or outer surfaces of the dome 126, much of the emitted light will be backscattered into the device 120. In sharp contrast, when the packaged LED 130 is mounted relative to an elongated hollow wavelength conversion tube as shown in FIG. 1B, at least 20% of the emitted light 122 can strike the elongated hollow wavelength conversion tube wall 112 at an oblique angle, as shown in FIG. 1B. The backscattering of light back into the semiconductor light emitting device 120 may be substantially reduced. Moreover, in some embodiments, at least about 90% of the emitted light 122 can strike the elongated hollow wavelength conversion tube wall 112 at an oblique angle, as shown in FIG. 1B. The backscattering of light back into the semiconductor light emitting device may be substantially reduced.

Accordingly, some embodiments of the present invention may allow light that is emitted from the semiconductor light emitting device 120 to pass through the dome 126 generally orthogonal thereto, but to strike the elongated hollow wavelength conversion tube wall 112 substantially oblique thereto. Thus, some embodiments of the invention may be regarded as providing a primary optical surface, such as the dome 126 of the packaged light emitting diode 130, wherein Lambertian radiation causes almost all of the emitted light to cross the surface orthogonal thereto, and the elongated wavelength conversion tube wall 112 provides a secondary optical surface including wavelength conversion material 114 dispersed therein, wherein almost all of the light impinges on the secondary optical surface 112 at an oblique angle thereto.

Without wishing to be bound by any theory of operation, high efficiency of embodiments of the present invention may also be explained due to different path lengths that may be established within the elongated hollow wavelength conversion tube 110. In particular, referring to FIGS. 3 and 3A, the emitted light 122 from the semiconductor light emitting device 120 reflects off the inner surface of the tube wall 110, as shown by ray 310, and also refracts within the tube wall, as shown by ray 312. Additional internal reflection takes place from the outer wall, as shown as by ray 314, and some of the original light 316 emerges from the tube. The path through the wall 112 is indicated by ray 312. In contrast, when light strikes a phosphor particle 114 that is embedded within the tube wall 112, it is converted and scattered in all directions, as shown by the rays 322.

Accordingly, as shown in FIGS. 3 and 3A, except for near the semiconductor light emitting device 120, very little light is reflected back at the semiconductor light emitting device 120. In order for the light 122, such as blue light, that emerges from the semiconductor light emitting device 120 to convert, for example to yellow light, it must impinge on a wavelength conversion material (e.g., phosphor) particle 114. Once it does convert, it is desirable for the converted emission 322 to escape with minimal obstruction, not only from the LED 130 but also from other wavelength conversion material particles 114. Thus, it is desirable for the wavelength conversion material layer to appear thick for the blue light, but thin for the yellow emission 322. The tube 110 helps to achieve this, because the blue light has a longer path 312 through the tube wall 112 at grazing incidence and the same amount of conversion can be achieved with less wavelength conversion material 114. Thus, since the blue light has a longer path length 312 through the tube wall 112 at grazing incidence, the tube appears thicker for the incoming blue light. Since the tube appears thicker, a lower concentration of phosphor may be used. By using a lower concentration of phosphor, less phosphor obstruction may be provided. Accordingly, in some embodiments, the elongated hollow wavelength conversion tube 110 is oriented relative to the semiconductor light emitting device 120, so as to provide a longer path length 312 through the elongated wavelength conversion tube wall 112 for light 122 that is emitted by the semiconductor light emitting device 120 that does not strike the wavelength conversion material 114 embedded therein, without increasing the path length of light 322 that is converted by the wavelength conversion material 114 embedded therein.

Various configurations of elongated hollow wavelength conversion tubes may be provided according to various embodiments of the present invention. For example, as shown in FIG. 4, the elongated hollow wavelength conversion tube 110 includes first and second opposing ends 110a, 110b, and the semiconductor light emitting device 120 is adjacent the first end 110a. It will also be understood that in FIG. 4 and other figures to follow, the semiconductor light emitting device 120 is shown outside the elongated hollow wavelength conversion tube 110. In these embodiments, a reflector, lens and/or other optical element may be provided to direct the light 122 inside the tube 110. However, in other embodiments, the semiconductor light emitting device 120 may extend at least partially into the elongated hollow wavelength conversion tube 110. In yet other embodiments, the semiconductor light emitting device 120 extends fully into the elongated hollow wavelength conversion tube 110.

In FIG. 4, the second end 110b is an open end. In contrast, in FIG. 5, the second end 110b is a closed second end, which may be provided by a cap 510. The cap 510 may be reflective and/or may contain wavelength conversion material therein. The cap 510 may be planar or non-planar as illustrated. For example, a hemispherical, prismatic, textured and/or microlens-covered cap may be provided. The wavelength conversion material in the cap 510 may be same as, or different from the wavelength conversion material 114 in the elongated wavelength conversion tube wall 112 in terms of composition and/or concentration. In other embodiments, as shown in FIG. 6, the second end 110b is a crimped second end 610. It will be understood that the word "crimped" is used herein to denote a tapered end, and not to denote any particular manufacturing method. Thus, FIG. 6 illustrates embodiments of bullet-shaped elongated hollow wavelength tubes 110.

Figure 7:
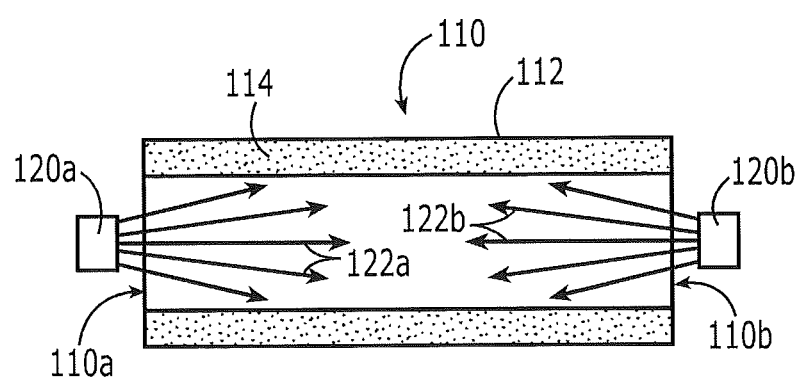

Embodiments of the invention that have been described above employ one or more semiconductor light emitting devices 120 at a first end 110a of the elongated hollow wavelength conversion tube 110. However, in other embodiments, at least one semiconductor light emitting device may be provided at both ends of the tube 110. For example, as shown in FIG. 7, a first semiconductor light emitting device 120a is included adjacent the first end 110a of the elongated hollow wavelength conversion tube 110, and oriented to emit light inside the elongated hollow wavelength conversion tube 110. A second semiconductor light emitting device 120b is located adjacent the second end 110b and is oriented to emit light 122b inside the elongated hollow wavelength conversion tube.

Figure 8:
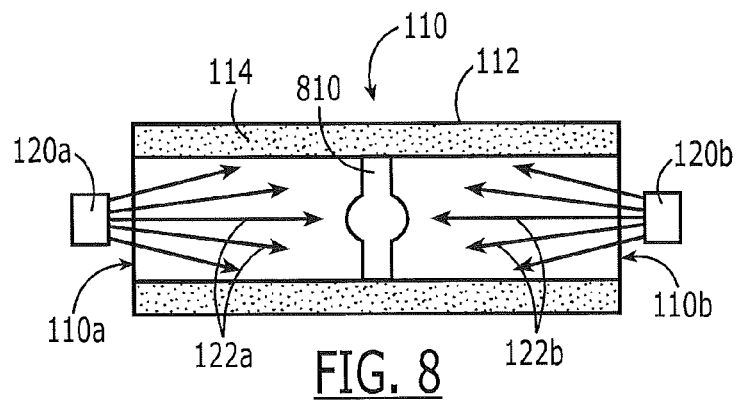
Figure 9A:
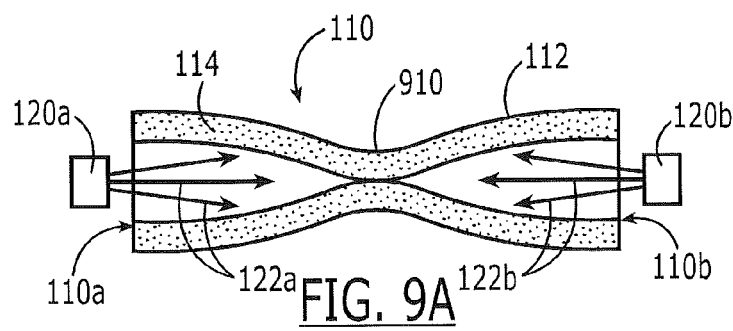
Figure 9B:
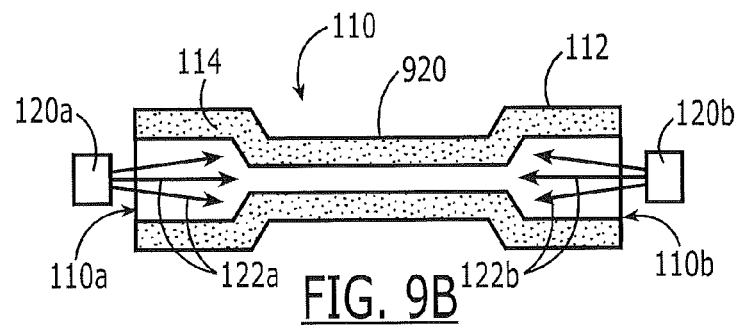

FIG. 8 illustrates other embodiments wherein a double-sided reflector 810 is included in the elongated hollow wavelength conversion tube 110 between the first and second semiconductor light emitting devices 120a, 120b. The double-sided reflector 810 may be embodied as a mirror, a reflective sphere and/or other device that reflects at least some light impinging thereon. For example, a spherical, prismatic, textured and/or microlens-covered double-sided reflector may be provided. The double-sided reflector 810 may be flat or non-planar as shown. The double-sided reflector also may include wavelength conversion material. FIG. 9A illustrates other embodiments wherein the elongated hollow wavelength conversion tube 110 is crimped as shown at 910, between the first and second semiconductor light emitting devices 120a, 120b. FIG. 9A shows a gradual crimp that is fully closed, whereas FIG. 9B illustrates an abrupt crimp 920 that is not fully closed.

Figure 10:
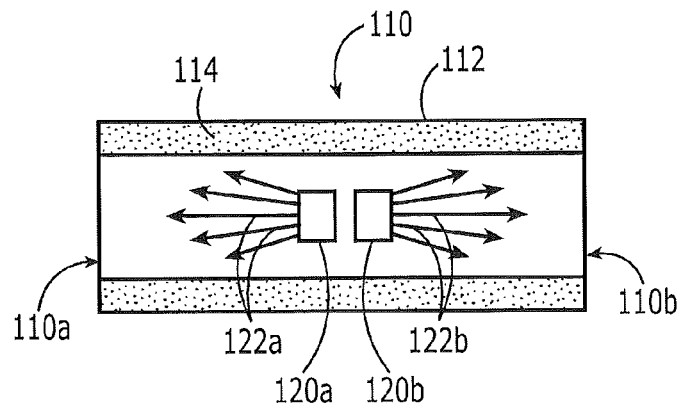

FIG. 10 illustrates other embodiments wherein the first and second semiconductor light emitting devices 120a, 120b are oriented in back-to-back relation within the elongated hollow wavelength conversion tube 110, such that the first semiconductor device 120a emits light 122a towards the first end 110a and the second semiconductor light emitting device 120b emits light 122b towards the second end 110b. In other embodiments, the first and/or second ends 110a, 110b may include a cap, such as a cap 510 of FIG. 5, may be crimped or tapered, such as by including crimp 610 of FIG. 6, or may be open as shown. Also, the two ends need not have the same type of termination.

Figure 11A:
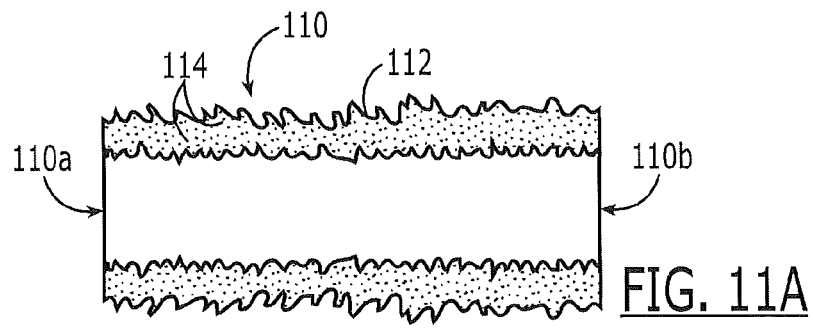
FIGS. 11A-14 are cross-sectional views of elongated hollow wavelength conversion tubes according to various embodiments.
Figure 11B:
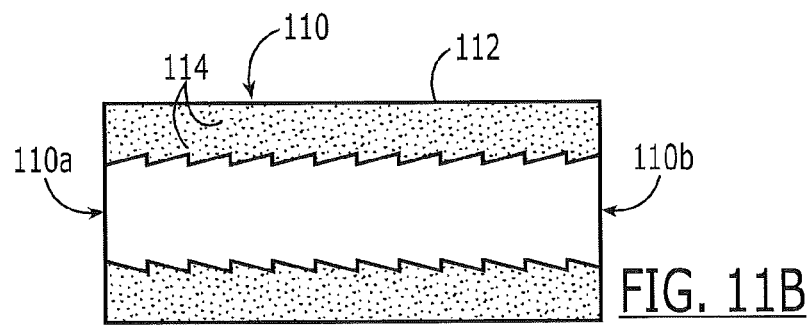

The elongated hollow wavelength conversion tube 110 itself may also have many different configurations. For example, in FIG. 11A, the elongated tube wall 112 includes inner and outer surfaces wherein the inner and/or outer surfaces are textured as shown. The texturing may be uniform and/or non-uniform. Texturing may enhance scattering of light. Moreover, FIG. 11B illustrates other embodiments wherein a sawtooth pattern or other pattern may be used to guide the unconverted light, so as to further increase its path length in the wavelength conversion tube. Other light guiding patterns may also be used.

Figure 12:
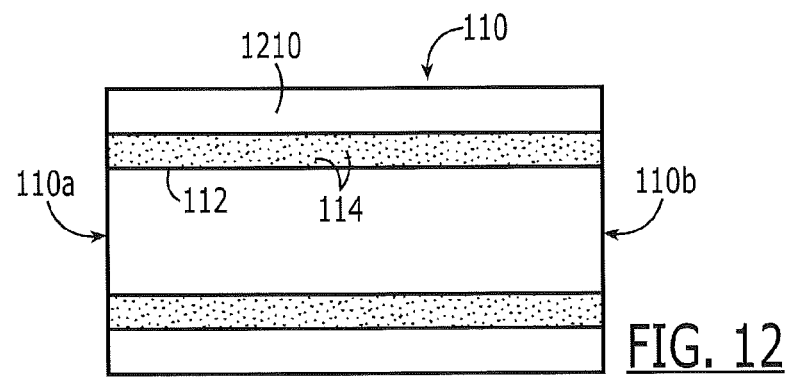
Figure 13:
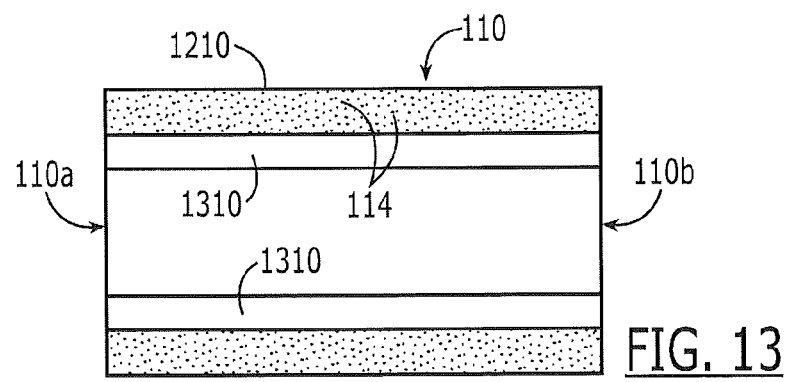

In other embodiments, as shown in FIGS. 12 and 13, a supporting layer may be provided to support the elongated wavelength conversion tube wall 112. In FIG. 12, the supporting layer 1210 is on the outer surface of the elongated hollow wavelength conversion tube wall 112, whereas in FIG. 13, the supporting layer is on the inner surface of the elongated hollow wavelength conversion tube wall 112. In fact, embodiments of FIGS. 12 and 13 may be fabricated by coating a wavelength conversion material 114 inside or outside a supporting tube 1210, 1310, respectively, so that the elongated hollow wavelength conversion tube 110 may actually be embodied as a coating on a supporting material. In still other embodiments, a supporting layer may be provided on both the inside and outside surfaces of the elongated wavelength conversion tube wall 112.

Figure 14:
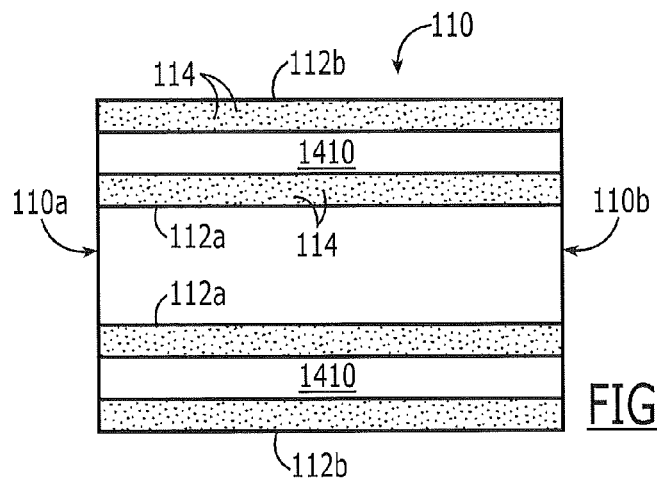

Multiple concentric elongated hollow conversion tubes 112 also may be provided according to other embodiments. In particular, as shown in FIG. 14, a first elongated hollow wavelength conversion tube 112a and a second elongated hollow wavelength conversion tube 112b are provided coaxial to one another. The tubes may be spaced apart and may be supported by a common supporting layer 1410. In fact, embodiments of FIG. 14 may be fabricated by coating inner and outer surfaces of a supporting layer 1410 with wavelength conversion material 114. In embodiments of FIG. 14, the wavelength conversion material 114 dispersed in the first and second elongated wavelength conversion tube walls 112a, 112b may be the same or may be different in composition and/or concentration.

Figure 15:
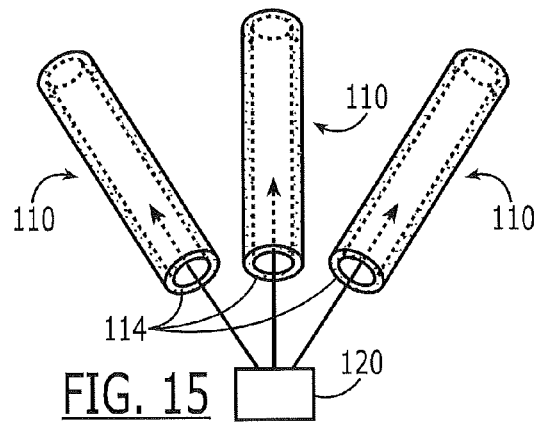
FIGS. 15-18 are cross-sectional views of semiconductor light emitting apparatus according to still other embodiments.
Figure 16:
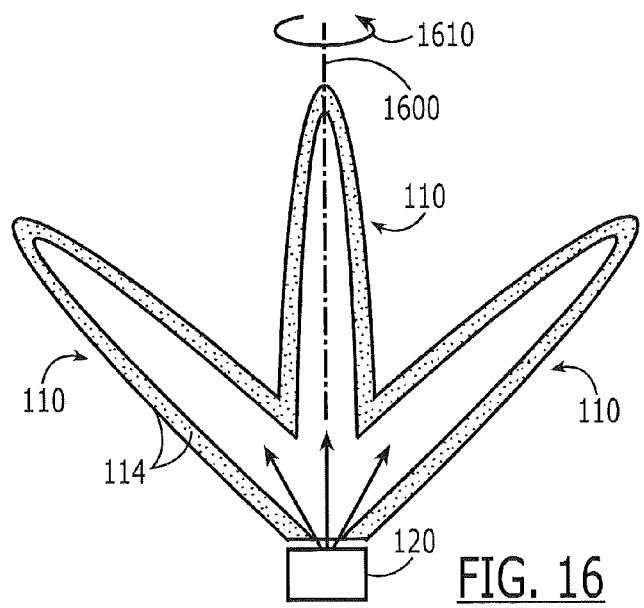

FIG. 15 illustrates other embodiments wherein a plurality of elongated hollow wavelength conversion tubes 110 are provided for a semiconductor light emitting device 120 or a cluster of semiconductor light emitting devices 120. Thus, a semiconductor light emitting device 120, or a cluster of semiconductor light emitting devices 120, is adjacent a first end of each of the tubes. In FIG. 16, the elongated hollow wavelength conversion tubes 110 extend about a common origin, and the semiconductor light emitting device 120 is adjacent the common origin. In some embodiments, FIG. 16 may be regarded as a cross-sectional view showing a plurality of hollow wavelength conversion tubes 110 that surround a common origin and extend within the plane of the figure to provide a two-dimensional array. FIG. 16 may also be regarded as illustrating a cross-section of a three-dimensional array of hollow elongated tubes 110 that extend around a common axis 1600, as shown by arrow 1610. Thus, flower petal-like designs may be provided for semiconductor light emitting apparatus according to these embodiments.

Figure 17:
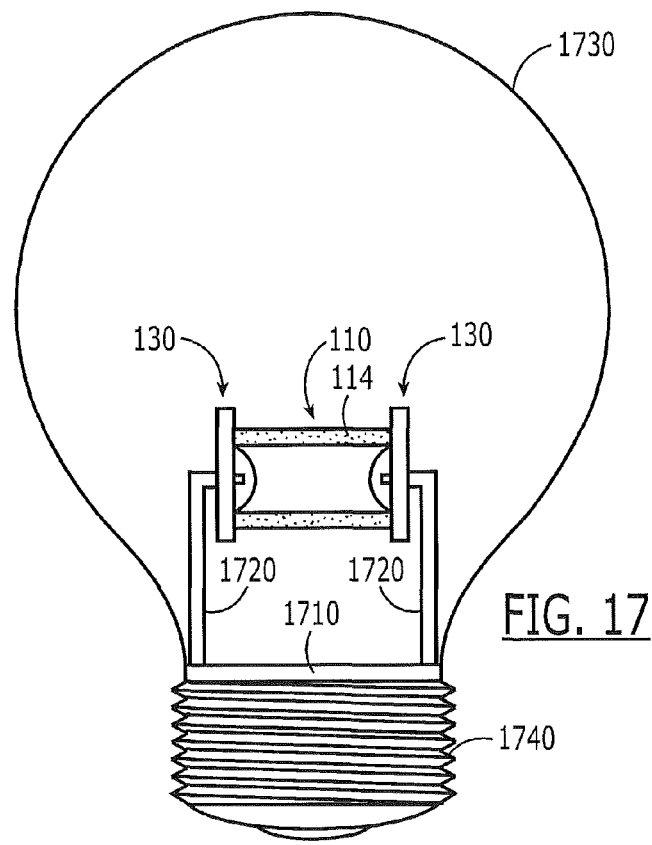

Various embodiments of the invention as described above may also be regarded as providing a semiconductor light emitting filament that may be analogized to the filament of a conventional incandescent lamp or to a miniature fluorescent bulb. Thus, as shown in FIG. 17, an elongated hollow wavelength conversion tube 110 includes a packaged semiconductor light emitting device 130 at either end. The packaged semiconductor devices 130 may be mounted on a base 1710 using heat conductive standoffs 1720 and/or other conventional mounting techniques. A bulb 1730 and a screw-type base 1740 may be provided, so that the combination of the elongated hollow wavelength conversion tube 110 and the packaged semiconductor light emitting devices 130 at opposite ends thereof provides a filament for a drop-in replacement for an incandescent bulb. It will be understood that FIG. 17 provides a simplified representation and that a drop-in replacement for an incandescent bulb may also employ voltage conversion circuits, thermal management systems, etc.

Figure 18:
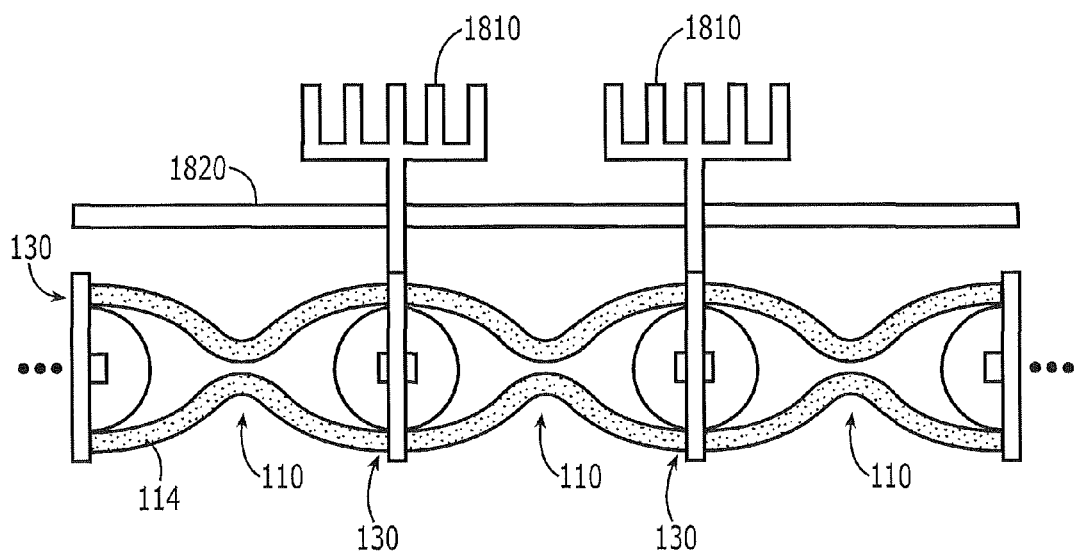

In other embodiments, as shown in FIG. 18, the filaments are oriented end-to-end in a linear array. Heat sinks 1810 and/or a reflector 1820 may also be provided.

Some embodiments are capable of generating white light at an efficacy of more than 200 lumens/watt, an efficacy that may enable the broader adoption of solid state lighting devices in applications that have traditionally been served by incandescent and/or fluorescent light sources.

Increased efficacy of light emission according to some embodiments may be obtained by increasing the size of the light emitting diode chip in the apparatus. A larger chip can produce more optical output power and may be driven at a lower forward voltage, both of which can increase the efficiency of the apparatus. Furthermore, high conversion efficiency can be obtained using wavelength conversion techniques described herein.

In particular, efficacy of 208 lumens per watt was obtained using an LED chip having dimensions of 1.75 mm×1.75 mm, for a total chip area of about 3 $mm^2$, driven at a drive current of 350 mA at room temperature. Light generated by the apparatus had a color temperature of 4579 K. Even greater lumens per watt can be achieved using a larger LED chip. For example, in excess of 230 lumens per watt can be achieved using a light emitting diode may have an area of about 4 $mm^2$ with dimensions of about 2 mm×2 mm.

Accordingly, a semiconductor light emitting apparatus according to some embodiments includes a wavelength conversion element comprising wavelength conversion material, and a light emitting diode that is oriented to emit light to impinge upon the wavelength conversion element. The semiconductor light emitting apparatus may produce greater than 200 lumens per watt at a color temperature of between 2000 K and 8000 K.

The light emitting diode may include a blue light emitting diode. In particular embodiments, the light emitting diode may have an area greater than about 1 $mm^2$, and in some embodiments the light emitting diode has an area of about 3 $mm^2$. For example, the diode may have dimensions of about 1.75 mm×1.75 mm. At a drive current of 350 mA, this corresponds to a current density of about 11.4 $A/cm^2$.

An apparatus according some embodiments may produce greater than 200 lumens per watt at a color temperature of between 4000 K and 5000 K. For example, an apparatus according to some embodiments may produce greater than 200 lumens per watt at a color temperature of about 4600 K.

An apparatus according to some embodiments may produce greater than 200 lumens per watt at a drive current of 350 mA at room temperature.

An apparatus according to some embodiments includes a light emitting diode having a cross sectional area selected to provide a current density of less than 30 $A/cm^2$ at a drive current at which the semiconductor light emitting apparatus produces greater than 200 lumens per watt at a color temperature of between 2000 K and 8000 K. In some embodiments, the light emitting diode has a cross sectional area selected to provide a current density of less than 20 $A/cm^2$ at a drive current at which the semiconductor light emitting apparatus produces greater than 200 lumens per watt at a color temperature of between 2000 K and 8000 K, and in some embodiments the light emitting diode has a cross sectional area selected to provide a current density of less than 15 $A/cm^2$ at a drive current at which the semiconductor light emitting apparatus produces greater than 200 lumens per watt at a color temperature of between 2000 K and 8000 K.

FIGS. 20A, 20B and 20C are a top view, a cross-section and a bottom view, respectively, of a semiconductor LED device 300 that may be used in some embodiments.

In embodiments of FIG. 20A, the outer face 320b' of the substrate 320 of the LED 300 includes at least one groove, such as an X-shaped groove 315 therein. Multiple X-shaped grooves and/or other shaped grooves may also be provided. Moreover, as shown in FIG. 20C, in some embodiments, the anode contact 360 and the cathode contact 370 may collectively occupy at least about 90% of the active diode region area.

Specifically, FIGS. 20A-20C illustrate an embodiment wherein the inner face 320c of the substrate 320 is a square inner face 320c having sides that are about 1,000 µm long, the outer face 320b' is a square outer face having sides that are about 642 µm long, and a thickness or distance t between the square inner and outer faces (also referred to as "height") is about 335 µm, so as to define an area ratio between the outer face 320b and the inner face 320c of about 0.41. The diode region 310 may also be a square, having sides that are about 1,000 µm long. A small gap 320 of about 75 µm is provided. A calculation of the active attach area may be made as follows:

Total active area of diode region=751,275 $µm^2$(cathode)+70,875 $µm^2$(gap)+70,875 $µm^2$(anode)=893,025 $µm^2$.

Total active attach area=751,275 $µm^2$(cathode)+70,875 $µm^2$(anode)=822,150 $µm^2$.

Thus, the active attach area is at least about 90% of the active diode region area.

Table 1 illustrates various configuration geometries of the substrate 320 that may be provided according to various other embodiments. It will be understood that the "area ratios" used herein are based on the dimensions of the sides of the faces and do not include any added surface area due to texturing, grooves and/or other light extraction features.

TABLE 1

| Designator | Base (Inner) Area, $µm^2$ | Top (Outer) Area, $µm^2$ | Area Ratio (Top/Base) | Aspect Ratio (Height/Base) |
|---|---|---|---|---|
| DA1000 | 1000000 | 412164 | 0.412 | 0.335 |
| DA850 | 722500 | 242064 | 0.335 | 0.394 |
| DA700 | 490000 | 116964 | 0.238 | 0.5 |

Figure 20:
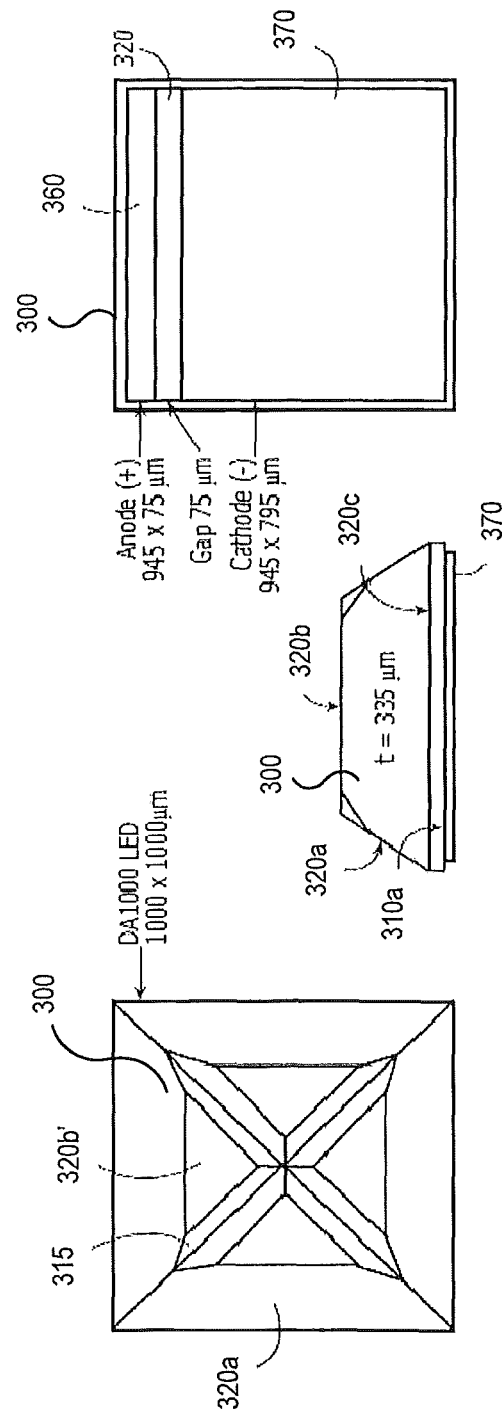
FIGS. 20A, 20B and 20C are a top view, a cross-section and a bottom view, respectively, of an LED according to some embodiments.
Figure 21:
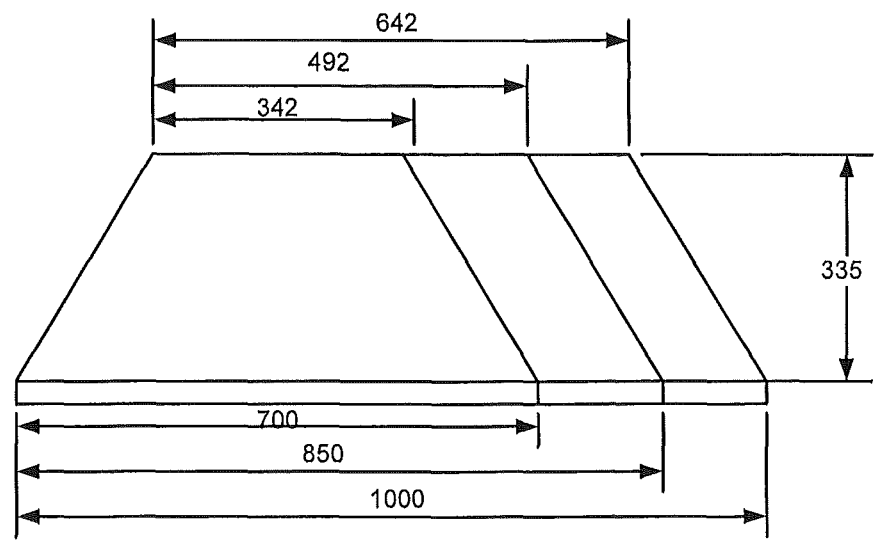
FIGS. 21 and 22 illustrate various geometries of substrates of FIGS. 20A-20C, according to various embodiments described herein.

FIG. 21 illustrates these embodiments. Specifically, the top row of Table 1 illustrates various embodiments wherein the inner face 320c is a square inner face having sides that are about 1000 µm long (total area 1,000,000 $µm^2$), the outer face 320b is a square outer face having sides that are about 642 µm long (total area 412,164 $µm^2$) and a distance (height) between the square inner and outer faces is about 335 µm so as to define an area ratio of the outer face to the inner face (top to base) of about 0.41, and an aspect ratio of height to a side of the inner face (base) of about 0.335. These embodiments are also illustrated in FIG. 20B. The second row of Table 1 illustrates embodiments wherein the inner face 320c is a square inner face having sides that are about 850 μm long (total area 722500 μm=$^2$), the outer face 320b is a square outer face having sides that are about 492 μm long (total area 242064 μm$^2$) and a distance (height) between the square inner and outer faces is about 335 μm so as to define an area ratio of the outer face to the inner face of about 0.33 and an aspect ratio of height to base of about 0.39. Finally, the third row of Table 1 illustrates various embodiments wherein the inner face 320c is a square inner face having sides that are about 700 μm long (total area about 722500 μm$^2$), the outer face 320b is a square outer face having sides that are about 342 μm long (total area about 116964 μm$^2$) and a distance height between the square inner and outer faces is about 335 μm so as to define an area ratio of the outer face to the inner face of about 0.24 and an aspect ratio of height to base of about 0.5.

Figure 22:
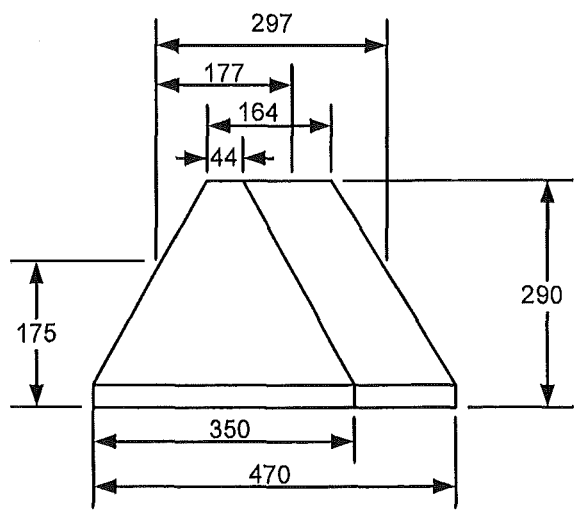

FIG. 22 and Table 2 illustrate other embodiments wherein the inner face 320c is a rectangular inner face of size 350 μm×470 μm. In the first line of Table 2, the height is about 175 μm thick, and the outer face 320b is a rectangle of size 177 μm×297 μm, so as to provide a base (inner) area of 164500 μm$^2$ and a top (outer) area of 52569 μm. The area ratio of top to base is about 0.32, and the ratio of height to base is about 0.5. The second line of Table 2 illustrates a thicker height of about 290 μm, so that the top has sides of about 44 μm×164 μm, leading to an area ratio of about 0.044 and a ratio of height to base of about 0.8.

TABLE 2

| Designator | Base (Inner) Area, μm$^2$ | Top (Outer) Area, μm$^2$ | Area Ratio (Top/Base) | Aspect Ratio (Height/Base) |
|---|---|---|---|---|
| DA350 - Standard 175 μm thick | 164500 | 52569 | 0.319568389 | 0.5 |
| DA350 Extreme - 290 μm thick | 164500 | 7216 | 0.043866261 | 0.828 |

Accordingly, embodiments of Table 1 and Table 2, corresponding to FIGS. 21 and 22, can provide light emitting diodes wherein an area ratio of the outer face to the inner face is less than or about 0.4 and, in some of these embodiments, the aspect ratio of the height to a side of the inner face is at least about 0.3. These tables and figures also illustrate other embodiments wherein the area ratio of the outer face to the inner face is less than or about 0.33 and, in some embodiments, the aspect ratio of the height to a side of the inner face is at least about 0.4. These tables and figures also illustrate yet other embodiments wherein the area ratio of the outer face to the inner face is less than or about 0.04 and, in some embodiments, the height to base aspect ratio is at least about 0.8.

It has been found that light extraction may be improved as the ratio of the outer area to the inner area is reduced. The larger area devices, such as the DA1000 described on the first line of Table 1 can provide additional extraction by providing a groove, as was illustrated in FIG. 20A. This would appear to indicate that further extraction benefit would be obtained by a further reduction in the ratio of the top to base, but this may be expensive due to the blade width that may be needed for beveling the sidewalls. On the smaller devices, such as the DA350 described in the first row of Table 2, there may be no further gain at blue light in further increasing the ratio, so that an aspect ratio of about 0.32 may already be sufficient for maximum blue light extraction.

Figure 23:
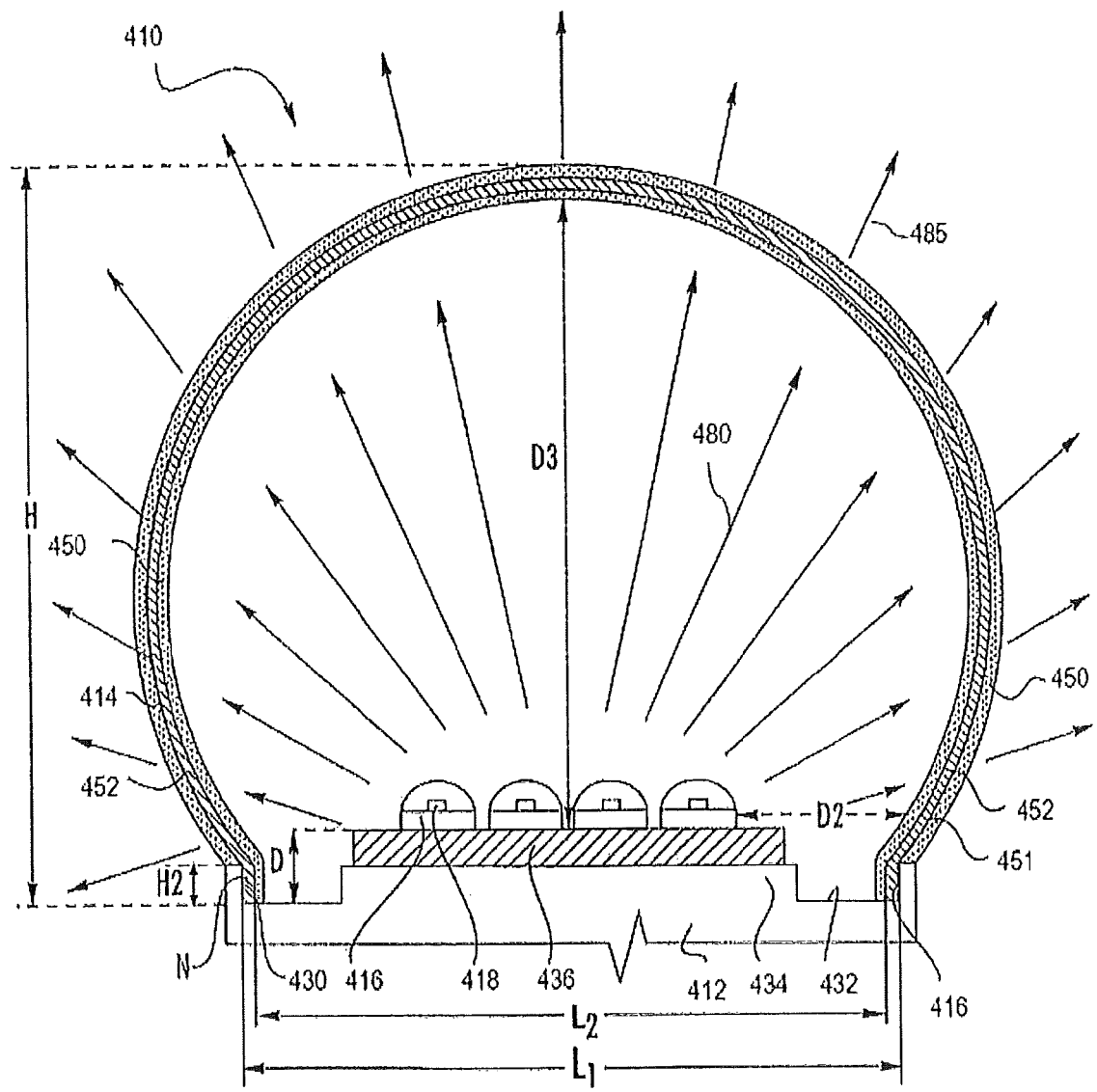
FIG. 23 is a cross-sectional view of a semiconductor light emitting apparatus according to other embodiments.

Embodiments of the invention that are capable of greater than 200 lumens per watt at a color temperature of between 2000 K and 8000 K are shown in FIG. 23, which illustrates a cross-sectional view of a light emitting apparatus 410 that is capable of greater than 230 lumens per watt, and in some cases up to 250 lumens per watt. In the light emitting apparatus 410, packaged LEDs 416 are disposed on a platform 434 of a body 412. In the embodiments shown in FIG. 23, the LED chips 418 are provided in LED packages 416; however, unpackaged LEDs 418 could also be used. In some embodiments, the packaged LEDs 416 include blue light emitting XLamp® LEDs manufactured by Cree, Inc., Durham, N.C., the assignee of the present invention. The LEDs may include large area power LEDs having an area greater than 1 mm$^2$, and in some cases having an area of about 4 mm$^2$. In some embodiments, a single blue XLamp® LED manufactured by Cree, Inc., may be used. The power LEDs 418 used in some embodiments may be capable of being driven at very high forward current levels. For example, power LEDs 418 used in some embodiments may be capable of being driven at up to 3000 mA.

LEDs 418 and/or LED packages 416 can be mounted directly over the platform 434 of the body 412, or as illustrated, the LED packages 416 can be mounted over mounting substrate 436. The LEDs 418 can be attached within the LED packages 416 using any suitable die attach materials and/or methods. For example, in one aspect the LEDs 418 can be attached within packages 416 using metal-to-metal bonding techniques including flux-assisted eutectic die attach, metal-assisted non-eutectic die attach, or thermal compression die. Metal-to metal die attach includes a robust die attach resulting in a more reliable die attach during operation of remote component 410. This can result in fewer LEDs becoming detached during operation. In the alternative, the LEDs 418 can be attached using silicone, silver (Ag) epoxy, solder. Any suitable die attach can be used.

As FIG. 23 illustrates, an outer shell 414 is provided over the platform 434. The cover 414 is formed of a transparent material such as glass or plastic, and defines a volume over the LEDs 416. The volume may be filled with air, or some other transparent substance. The shell 414 may have a dome shape, a hemispherical shape or other similar shape. The shell 414 includes an outer surface 451 and an inner surface 452. Outer and inner surfaces 451 and 452 can be coated with one or more layers of optical materials to thereby emit light external from the shell 414 having desired optical properties. For illustration purposes, both the outer and inner surfaces 451 and 452 of the apparatus 410 shown in FIG. 23 are coated with optical material. However, in some aspects only one of the outer or inner surface 451 and 452 may be coated. In particular embodiments, a mixture of YAG phosphor and transparent silicone encapsulant may be applied to the shell 414. An Eu-doped barium orthosilicate (BOSE) phosphor may also be used alone or in combination with a YAG phosphor.

In some embodiments, a red phosphor may be incorporated into the wavelength conversion material. Suitable red phosphors are disclosed, for example, in U.S. application Ser. No. 13/15,315, filed Jun. 3, 2011, entitled Methods Of Determining And Making Red Nitride Compositions, U.S. application Ser. No. 13/152,863, filed Jun. 3, 2011, entitled Red Nitride Phosphors, and/or U.S. application Ser. No. 13/154,872, filed Jun. 7, 2011, entitled Gallium-Substituted Yttrium Aluminum Garnet Phosphor And Light Emitting Devices Including The Same, the disclosures of which are hereby incorporated herein in its entirety as if set forth fully herein. In other embodiments, a red emitter may be incorporated into the LED package as described in U.S. Publication No. 2011/-227469, published Sep. 22, 2011, entitled Led Lamp With Remote Phosphor And Diffuser Configuration Utilizing Red Emitters, the disclosure of which is hereby incorporated herein in its entirety as if set forth fully herein.

When electrical current is passed through LED packages 416, LEDs 418 can emit light 480 towards an inner surface 452 of the shell 414. Optical materials coated on either the inner and/or outer surfaces 451 and 452 can interact with light emitted from the one or more LEDs 418 to emit light 485 having a desired wavelength and/or brightness.

Optical materials can include luminescent materials having an amount of wavelength conversion material 450. Any suitable phosphor can be used with remote component 410. Wavelength conversion material 450 can generate light of desired perceived colors when the light emitted from the LEDs 418 interacts with the phosphor. Other materials, such as dispersers and/or index matching materials may be included in the wavelength conversion material 450. Wavelength conversion material 450 can be applied and/or coated to shell 414 using any suitable method. In one aspect, a predetermined weight of wavelength conversion material 450 can be mixed with an adhesive material and loaded in a syringe. The mixture can then be coated to outer surface 451 and/or inner surface 452 of shell 414 and can optionally be cured. In one aspect, the mixture may be spray coated, however, any suitable coating method 410 can be used. For example, wavelength conversion material 450 can coat the inside and/or outside of the shell 414 by spraying, brushing, molding, encapsulating, adhering, dipping, and/or any combinations thereof. Any suitable coating method can be used. The shell 414 can be cleaned, measured, and inspected prior to assembly over body 412 such that defects in the coating can be detected and cured prior to assembly. Adhesive material can include any suitable material, not limited to silicone or other encapsulants.

Still referring to FIG. 23, the wavelength conversion material 450 is remotely located with respect to the LEDs 418 and LED packages 416. Wavelength conversion material 450 therefore can be excluded from being disposed, for example, directly on and over LEDs 416 or within LED packages 418. Stated differently, the LED packages 416 can be free of any wavelength conversion material. The wavelength conversion material 450 can be located any suitable distance from the LEDs, for example, at least approximately 1 mm or greater. As FIG. 23 illustrates, LEDs 418 can be mounted a first distance D over upper surface 432 of body 412. This can, in part, allow light to be reflected and emitted below the LEDs 418. First distance D can include any suitable distance. Phosphor can be remotely located from the one or more LEDs 418 and/or LED packages 416 a minimum distance of D2 from wavelength conversion material 450. The minimum distance D2 can include any suitable distance, for example, at least approximately 1 mm or greater. In one aspect, the minimum distance D2 can be equal to approximately 20 mm or greater, depending on the desired size of remote component. Any suitable minimum distance D2 is contemplated herein. LEDs 418 and/or LED packages 416 can also be located a maximum distance D3 from phosphor 20 material 450. In one aspect, LEDs and/or LED packages 416 can be disposed substantially beneath or below shell 414. FIG. 20 illustrates LEDs 418 disposed substantially beneath a substantially circular, domed, and/or rounded shell 414. However, shell 414 can include any suitable size and/or shape. In addition, LEDs 418 and/or LED packages 416 can be disposed at any position below shell 414. As illustrated, LEDs 418 and LED packages 416 can be substantially disposed beneath a center of shell 414, the center corresponding to maximum distance D3. However, LEDs 418 and/or LED packages 416 can be positioned at suitable location below shell 414, for example, to the left or right of center. Size, number, and positioning of LEDs 418 and LED packages 416 can affect light emission. Any suitable size and number of LEDs 418 and/or LED packages 416 can be used, and the LEDs 418 and/or LED packages 416 can be disposed at any suitable location substantially below shell 414.

Still referring to FIG. 23, the shell 414 can further include a neck portion N for engaging inner wall 430 of the body 412. Neck N is adapted to engage inner wall 430 using an adhesive or any suitable material. Neck N could also be adapted to frictionally or threadingly engage the inner wall 430 of the body 412. Any suitable method can be used to secure the neck N of the shell 414 to the inner wall 430 of the body. In one aspect, the neck N can be disposed below the plane on which the LEDs 418 are mounted, and can include any suitable size to accommodate sufficient structural strength when connecting and/or engaging to the body 412. In one aspect, the neck can include an outer diameter L1 of approximately 40 mm or less. In one aspect, the neck N can include an outer diameter L1 of approximately 30 mm or less, for example, approximately 25.7 mm or less. However, the neck N can include any suitable outer diameter L1. FIG. 20 further illustrates the neck N including an inner diameter, L2. The inner diameter L2 can correspond to the thickness of the shell 414, for example, where the cover includes a thickness of approximately 1 mm or less, the neck N can include an inner diameter of approximately 39 mm or more. The shell 414 can include any suitable thickness and any suitable inner diameter L2. In one aspect, the neck N can include an inner diameter L2 of approximately 30 mm or less, for example, approximately 24.5 mm or less. However, the neck N can include any suitable inner diameter L2.

The shell 414 and the neck N can also have any suitable height. In one aspect, the cover can include a height H measured from the base of the neck N to the furthest point of the outer surface. For example, for spherical shapes, the height can be measured from the topmost curvature of the shell 414. In one aspect, the shell 414 can have a height H of approximately 50 mm or less. In one aspect, the shell 414 can have a height approximately 40 mm or less. In one aspect, the shell 414 can include a height of approximately 35 mm or less, for example, approximately 33.4 mm or less. However, any suitable height H of cover is hereby contemplated. Similarly, the neck N can have a height H2. In one aspect, the neck N height H2 can include approximately 5 mm or less. In one aspect, the height H2 can be approximately 3 mm or less. In one aspect, the height H2 is approximately 2.8 mm. The neck N can include any suitable size, shape, height, and/or diameter. The shell 414 can be approximately 40 mm or less. In one aspect, the shell 414 can have an inner diameter of approximately 35 mm or less, for example, approximately 34.8 mm. The shell 414 can have an outer diameter from which light can be emitted. In one aspect, the shell 414 can have an outer diameter of approximately 45 mm or less. In one aspect, an outer diameter of the shell 414 can be approximately 36 mm or less. Any suitable size, shape, height, and/or diameter of the shell 414 is hereby contemplated.

An apparatus 410 described herein can target various colors and wavelengths of light. Light emitted from the apparatus 410 can include a combination of the light from the LEDs 418 and/or LED packages 416 in combination with the light emitted from wavelength conversion material 450. In one aspect, the apparatus 410 disclosed herein can consume a reduced amount of power as compared to conventional bulbs which require at least approximately 40-120 W. For example, remote components 410 described herein can use approximately 12.5 W or less of power, and in some cases less than one watt of power. In one aspect, remote components 410 described herein can use approximately 10 W or less of power. Thus, remote component devices and systems described herein can use several times less energy than conventional lighting products and light bulbs, thereby saving energy and reducing energy-related costs. In one aspect, remote components 410 described herein target cool white, outdoor white, neutral white, and warm white colors.

Apparatus 410 as described herein can, for example and without limitation, offer light output of approximately 800 lumens (lm) or more at 500 mA (12.5 W) at cool white, outdoor white, neutral white, and warm white color points. In some aspects, apparatus 410 as described herein can, for example and without limitation, offer light output of approximately 800 lumens (lm) or more at 10 W or less at cool white, outdoor white, neutral white, and warm white color points.

Apparatus 410 disclosed herein can be used alone and/or in lighting fixtures offering a minimum CRI of 75 for cool white, which corresponds to a range of 5,000 K to 10,000 K CCT. Apparatus 410 disclosed herein can also offer, for example, a minimum CRI of 80 for warm white, which corresponds to a range of 2,600K to 3,700K CCT. Apparatus 410 disclosed herein can also offer, for example, a minimum CRI for color points of 90 CRI which corresponds to a range of 2,600K to 3,200K CCT. Remote component 410 devices can be used for both standard and high voltage configurations. In one aspect, brightness can be improved by using optimized methods and/or procedures described herein. For example, an approximately 6% or more improvement in brightness can be attained using metal-to-metal die 15 attach as previously described herein. An approximately 4% or more improvement in brightness for example can be attained using a white solder mask around the one or more LEDs or LED packages.

In one aspect, typical performance at 12.5 W can include at least approximately 1040 lm and at least approximately 83 lm/W. Typical performance at 12.5 W can also include at least as minimum of 80 CRI and 3000 CCT within a 30F bin. Uniformity of light emitted from remote component 410 can be controlled by controlling the uniformity of the wavelength conversion material 450. In one aspect, uniformity can be controlled by adjusting a spray pattern of the wavelength conversion material 450 for instances where wavelength conversion material is spray coated to the outer surface 451 or inner surface 452 of shell 414.

In other aspects, an apparatus 410 as described herein is capable of generating more than 200 lm/W at a color temperature of between 2000 K and 8000 K. In some cases, an apparatus 410 as described herein is capable of generating more than 230 lm/W, and in still other cases an apparatus 410 as described herein is capable of generating over 230 lm/W, and in some cases up to 250 lm/W. Higher lm/W output may be obtained by driving the apparatus at lower current mA. For example, a lm/W output of 250 W was obtained by driving an apparatus including a 4 mm$^2$ LED device at 80 mA, which corresponds to about 0.22 W of power consumption at 2 A/cm$^2$, while 230 lm/W has been obtained by driving the device at 350 mA, corresponding to about 1 W of power at 8.75 A/cm$^2$.

An apparatus according some embodiments may produce greater than 230 lumens per watt at a color temperature of between 4000 K and 5000 K. For example, an apparatus according to some embodiments may produce greater than 200 lumens per watt at a color temperature of about 4600 K.

An apparatus according some embodiments may produce greater than 230 lumens per watt at a drive current of 350 mA or less at room temperature.

An apparatus according to some embodiments includes a light emitting diode having a device area selected to provide a current density of less than 15 A/cm$^2$ at a drive current at which the semiconductor light emitting apparatus produces greater than 200 lumens per watt at a color temperature of between 2000 K and 8000 K. In some embodiments, the light emitting diode has a device area selected to provide a current density of less than 10 A/cm$^2$ at a drive current at which the semiconductor light emitting apparatus produces greater than 200 lumens per watt at a color temperature of between 2000 K and 8000 K, and in some embodiments the light emitting diode has a cross sectional area selected to provide a current density of less than 5 A/cm$^2$ at a drive current at which the semiconductor light emitting apparatus produces greater than 200 lumens per watt at a color temperature of between 2000 K and 8000 K.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination. For example, any of the embodiments illustrated herein may include a bare semiconductor light emitting device die or a packaged semiconductor LED; an open-ended, capped or crimped end; one or more bare or packaged semiconductor light emitting devices that are entirely outside, partially inside or fully inside the elongated hollow wavelength conversion tube; one or more supporting layers; one or more elongated hollow wavelength conversion tubes arranged concentrically or in a two- or three-dimensional array and/or packaged to include heat sinks, reflectors, driving circuitry and/or other components.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A semiconductor light emitting apparatus comprising:
   a wavelength conversion element comprising wavelength conversion material; and
   a light emitting diode that is oriented to emit light to impinge upon the wavelength conversion element;
   wherein the semiconductor light emitting apparatus produces greater than 230 lumens per watt at a color temperature of between 2000 K and 8000 K.

2. An apparatus according to claim 1 wherein the light emitting diode comprises a blue light emitting diode.

3. An apparatus according to claim 1 wherein the light emitting diode has an area greater than about 1 mm$^2$.

4. An apparatus according to claim 1 wherein the light emitting diode has an area of about 4 mm$^2$.

5. An apparatus according to claim 1 wherein the semiconductor light emitting apparatus produces greater than 230 lumens per watt at a color temperature of between 4000 K and 5000 K.

6. An apparatus according to claim 1 wherein the semiconductor light emitting apparatus produces greater than 230 lumens per watt at a color temperature of about 4600 K.

7. An apparatus according to claim 1 wherein the semiconductor light emitting apparatus produces greater than 230 lumens per watt at a drive current of 350 mA or less at room temperature.

8. An apparatus according to claim 1, wherein the light emitting diode has a cross sectional area selected to provide a current density of less than 15 A/cm$^2$ at a drive current at which the semiconductor light emitting apparatus produces greater than 230 lumens per watt at a color temperature of between 2000 K and 8000 K.

9. An apparatus according to claim 1, wherein the light emitting diode has a cross sectional area selected to provide a current density of less than 10 A/cm$^2$ at a drive current at which the semiconductor light emitting apparatus produces greater than 200 lumens per watt at a color temperature of between 2000 K and 8000 K.

10. An apparatus according to claim 1, wherein the light emitting diode has a cross sectional area selected to provide a current density of less than 5 A/cm$^2$ at a drive current at which the semiconductor light emitting apparatus produces greater than 200 lumens per watt at a color temperature of between 2000 K and 8000 K.

11. An apparatus according to claim 1, wherein the light emitting diode has a cross sectional area selected to provide a current density of less than 9 A/cm$^2$ at a drive current of 350 mA at a color temperature of between 2000 K and 8000 K.

12. The apparatus of claim 1, further comprising:
a substrate;
one or more light emitting diodes disposed on the substrate;
a transparent outer shell covering the substrate and the light emitting devices and defining a volume of space between the light emitting diodes and the shell; and
an optical material remotely located at least a first distance away from the one or more light emitting devices for affecting light emitted from the one or more light emitting devices.

13. An apparatus according to claim 1 wherein the semiconductor light emitting apparatus produces between 200 and 250 lumens per watt.

14. An apparatus according to claim 13 wherein the semiconductor light emitting apparatus produces between 200 and 250 lumens per watt at a color temperature of between 4000 K and 5000 K.

15. An apparatus according to claim 13 wherein the semiconductor light emitting apparatus produces between 200 and 250 lumens per watt at a drive current of 350 mA or less at room temperature.

16. An apparatus according to claim 1 wherein the semiconductor light emitting apparatus produces between 230 and 250 lumens per watt.

17. An apparatus according to claim 14 wherein the semiconductor light emitting apparatus produces between 230 and 250 lumens per watt at a color temperature of between 4000 K and 5000 K.

18. An apparatus according to claim 13 wherein the semiconductor light emitting apparatus produces between 230 and 250 lumens per watt at a drive current of 350 mA or less at room temperature.

* * * * *